US008868442B1

(12) United States Patent
Odom

(10) Patent No.: US 8,868,442 B1
(45) Date of Patent: *Oct. 21, 2014

(54) SYSTEM FOR CATEGORIZING A SELLER RELATIVE TO A VENDOR

(76) Inventor: Gary Odom, Portland, OR (US)

(*) Notice: Subject to any disclaimer, the term of this patent is extended or adjusted under 35 U.S.C. 154(b) by 1662 days.

This patent is subject to a terminal disclaimer.

(21) Appl. No.: 11/616,269

(22) Filed: Dec. 26, 2006

Related U.S. Application Data

(62) Division of application No. 10/870,855, filed on Jun. 16, 2004.

(51) Int. Cl.
*G06Q 99/00* (2006.01)
*G06Q 30/02* (2012.01)

(52) U.S. Cl.
CPC .................................. *G06Q 30/0201* (2013.01)
USPC ............ 705/7.35; 705/10; 705/26.1; 705/400

(58) Field of Classification Search
CPC ....................... G06Q 30/0601; G06Q 30/0201
USPC ............. 705/1, 26, 35, 400, 1.1, 7, 10, 14.13, 705/14.43, 7.35, 14.1, 20, 26.1; 235/492
See application file for complete search history.

(56) References Cited

U.S. PATENT DOCUMENTS

| | | | |
|---|---|---|---|
| 5,822,736 A | | 10/1998 | Hartman |
| 5,842,178 A | * | 11/1998 | Giovannoli ...................... 705/26 |
| 5,873,069 A | * | 2/1999 | Reuhl et al. ...................... 705/20 |
| 5,960,407 A | | 9/1999 | Vivona |
| 6,076,070 A | * | 6/2000 | Stack .............................. 705/20 |
| 6,553,352 B2 | * | 4/2003 | Delurgio et al. .............. 705/400 |
| 6,618,717 B1 | | 9/2003 | Karadimitriou |
| 6,631,369 B1 | | 10/2003 | Meyerzon |
| 6,681,255 B1 | | 1/2004 | Cooper |
| 6,687,734 B1 | | 2/2004 | Sellink |
| 6,703,934 B1 | * | 3/2004 | Nijman et al. ............. 340/572.1 |
| 7,197,474 B1 | * | 3/2007 | Kitts ................................ 705/10 |
| 7,203,662 B2 | * | 4/2007 | Das et al. ......................... 705/37 |
| 7,287,000 B2 | * | 10/2007 | Boyd et al. .................. 705/14.43 |
| 7,315,826 B1 | * | 1/2008 | Guheen et al. ............... 705/7.29 |
| 7,343,319 B1 | * | 3/2008 | Walker et al. .................... 705/21 |
| 7,587,372 B2 | * | 9/2009 | Eglen et al. .................... 705/400 |
| 7,660,738 B1 | * | 2/2010 | Siegel et al. ..................... 705/20 |
| 7,739,203 B2 | * | 6/2010 | Kettner et al. ................. 705/400 |
| 2001/0047308 A1 | * | 11/2001 | Kaminsky et al. .............. 705/26 |
| 2002/0013782 A1 | | 1/2002 | Ostroff |
| 2002/0016779 A1 | | 2/2002 | Roll |
| 2002/0107861 A1 | * | 8/2002 | Clendinning et al. ........ 707/101 |
| 2002/0184102 A1 | * | 12/2002 | Markopoulos et al. ......... 705/26 |

(Continued)

OTHER PUBLICATIONS

RivalWatch Master Screen Shots (2000-2001), pp. 1-69 and RivalWatch Master Screen Shots (2002-2003), pp. 69-82.*

(Continued)

*Primary Examiner* — John Hayes
*Assistant Examiner* — Freda A Nelson
(74) *Attorney, Agent, or Firm* — Ferrauoli LLC

(57) ABSTRACT

Methods for competitive pricing are implemented in software for commerce in an electronic marketplace. A vendor may identify rivals: competitors against which the vendor most directly competes by dint of having similar reputation and market positioning. Using specified pricing models applied to filtered price data periodically gathered by spider-crawling competitors on the Internet, a vendor may adjust product prices to match rivals while accounting for overall marketplace price trends.

6 Claims, 8 Drawing Sheets

(56) References Cited

U.S. PATENT DOCUMENTS

| | | | |
|---|---|---|---|
| 2003/0050887 A1* | 3/2003 | Geiger | 705/37 |
| 2003/0130983 A1 | 7/2003 | Rebane | |
| 2003/0154142 A1* | 8/2003 | Ginsburg et al. | 705/28 |
| 2003/0191725 A1* | 10/2003 | Ratliff et al. | 705/400 |
| 2004/0172372 A1* | 9/2004 | Wells et al. | 705/400 |
| 2004/0249643 A1* | 12/2004 | Ouyang et al. | 705/1 |
| 2004/0267676 A1* | 12/2004 | Feng et al. | 705/400 |
| 2005/0131770 A1* | 6/2005 | Agrawal | 705/26 |
| 2005/0240492 A1* | 10/2005 | Grdina | 705/26 |
| 2007/0130090 A1* | 6/2007 | Staib et al. | 705/400 |

OTHER PUBLICATIONS

Ancarani et al., Price Levels and Price Dispersion on the Internet: A Comparison of Pure Play Internet, Bricks-and-Mortar, and Bricks-and-Clicks Retailers, Jun. 2002, Ebusiness Research Center, pp. 1-31.*

RivalWatch ScreenShots, 2000-2002, and 2002-2003.*

Kovar, Joseph F.; "Channel Web—ASP Pulse: Services to Spy on Competition , Outsource Drug Making", Aug. 25, 2000; CRN.com, 2 pgs.*

Sheel, Atul; "Monte Carlo Simulations and Scenario Analysis--Decision-Making Tools for Hoteliers" , Oct. 1995, Cornell Hotel and Restaurant Administration Quarterly, p. 18-26.*

Rivalwatch.com.*

RivalWatch Master Screen Shots (2000-2001), pp. 1-69 and RivalWatch Master Screen Shots (2002-2003), pp. 69-82.*

Sheel, Atul; "Monte Carlo Simulations and Scenario Analysis—Decision-Making Tools for Hoteliers", Oct. 1995, Cornell Hotel and Restaurant Administration Quarterly, p. 18-26.*

Rivalwatch.com Jan. 24, 2001, pp. 1-7.*

* cited by examiner

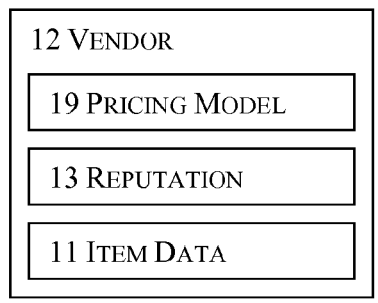
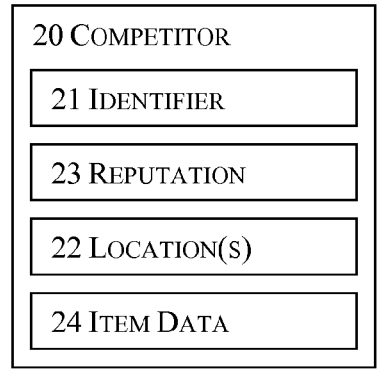
FIGURE 5A
FIGURE 5B
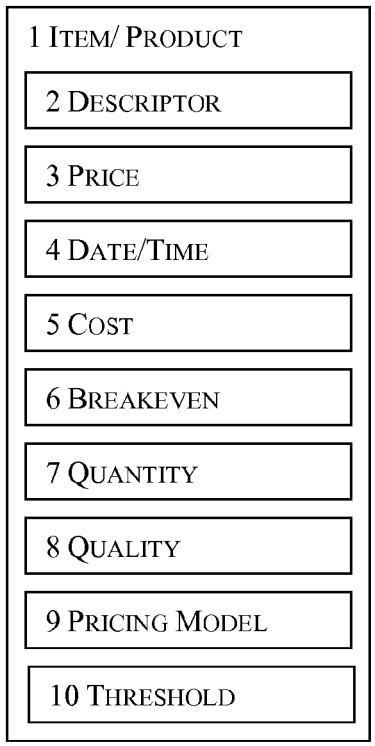
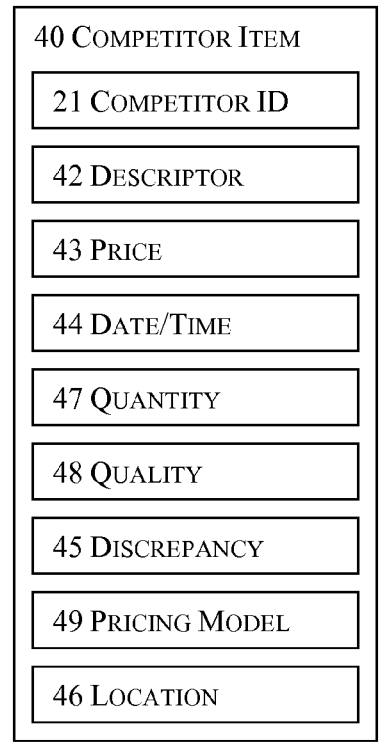
FIGURE 5C
FIGURE 5D

SYSTEM FOR CATEGORIZING A SELLER RELATIVE TO A VENDOR

CROSS-REFERENCE TO RELATED APPLICATIONS

Compliant with 35 U.S.C. 120 & 121, this application is a divisional of U.S. patent application Ser. No. 10/870,855, thereby claiming the priority date of Jun. 16, 2004.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The relevant technical field is market-based pricing implemented in software for commerce in an electronic marketplace, using pricing models, and allowing a vendor to identify and better compete against rivals, a subset of all sellers in a marketplace.

2. Description of the Related Art

Including Information Disclosed Under 37 CFR 1.97 and 1.98

The World Wide Web (the web) portion of the Internet provides a previously undreamt-of variety of goods and services at competitive prices as sellers vie in the broadest example of consumer capitalism the world has experienced.

To remain competitive, sellers must constantly be aware of the prices of their competitors. This problem is particularly acute on the web, where a consumer can readily compare prices and purchase from a seller of choice almost instantly, thus making competition ruthless.

The web site Half.com, for example, is an electronic flea market, where sellers post offering of the same goods at different prices. From a consumer perspective, the different prices may be accounted for by different quality in used goods, and a seller banking on its reputation to squeeze slices of what economists call 'rent' (excess profit). Reputation and quality equal, the higher-priced good stays a listing, while the lower-priced good is chalked up as a sale.

As U.S. Pat. No. 6,076,070 (Stack) states: "Currently, three main approaches exist for performing price comparisons (and therefore, indirectly, price adjustments). A vendor can make periodic comparisons with competitors' prices, can compare competitors' prices when a customer complains, or can compare prices when a customer makes a price inquiry.

"Periodic comparisons of the prices of competitors have drawbacks in that periodic comparisons may not reliably keep up with changes by competitors. Also, a great amount of effort is required in comparing all prices of all common products against a fixed set of competitors."

The "great amount of effort" Stack writes of becomes greater because there is no 'fixed' set of competitors on the web: the web continues to expand, with new competitors entering and others exiting (the ones whose goods stay as a listing, not a sale). Further, a seller competes most fiercely against its rivals, other similar sellers in reputation and market positioning, not equally against all other sellers in a marketplace. To optimize pricing, a seller must be able to identify and track who its rivals are.

Just as some bricks-and-mortar vendors on Main Street position themselves as upscale, like department stores Nordstroms and Sak's Fifth Avenue, renowned for quality products and service to customer satisfaction at a premium price, or for-the-masses, like the cut-rate sales warehouses Wal-Mart and Costco, e-commerce vendors market-position themselves, even if that concept may seem less obvious on the web. Obviously, all e-commerce web sites are not created equal: some are easier (or harder) to: 1) search and browse for products; 2) know about products from the information given; 3) compare products; 4) buy from; 5) reach and deal with customer service (including returns). Sellers that excel in these factors can afford to price their products at a premium and still rack up sales. Those that excel in the intangibles and price competitively are world-beaters.

Because of certain factors, such as shipping cost and shopping convenience, customers often buy multiple items on the web. Given that scenario, the convenience and transaction peace-of-mind a reputable seller offers may easily offset paying a slightly higher price.

The web site intangibles described above combined with the purchasing cost model (as a contrast, volume versus boutique (specialty item) purchasing) shape a seller's pricing model. The pattern of pricing a seller uses expresses the pricing model that represents the seller's market positioning. Pricing patterns tell the story of the pricing model. So, being competitive is appropriately viewed not as just having the lowest prices, but as having a successful pricing model against rivals who qualify as direct competition.

It is facile to think that, on the web, sellers of the same product compete on price alone. As on Main Street, market positioning results in a stratification of e-commerce sites. While it is relatively easy for customers to click from site to site, purchasing has a transaction cost, most tangibly shipping cost, but other costs relating to customer convenience and pleasure in the shopping experience, including the time it takes to find and purchase and item, and consumer peace of mind that the sellers delivers product in a timely manner with proper order fulfillment.

Relevant prior art is summarized below for the reader's convenience.

U.S. Pat. No. 6,076,070 (Stack) "Apparatus and method for on-line price comparison of competitor's goods and/or services over a computer network": discloses seeking a price comparison upon customer request of competitors' prices for an item. As quoted earlier, Stack explicitly dismisses the utility of periodic competitive price comparison, and so fails to anticipate the value of that mechanism. Stack particularly fails to anticipate using periodic comparison on a variety of items for sale as a regular method for price-setting. Stack does anticipate using a vendor-set threshold for determining whether a price adjustment may be offered to a user or automatically made. Stack only considers lowering prices, and does not consider the prospect of raising prices. Stack does anticipate that a price reduction from competitive analysis may be temporary or made the regular price.

U.S. Pat. No. 5,960,407 (Vivona) "Automated market price analysis system": discloses "a system for estimating price characteristics of a product from classified advertisements". With an exemplary preferred embodiment relating to job offerings, digitized newspapers ads are categorized based upon keyword lexical analysis of ad content. From the data, a price curve is developed. Oddly, prices are assumed to have a normal distribution, and deviation analysis performed with that assumption, regardless of the actual price curve. Regression analysis is performed to distinguish between different qualities in the data. This may make some sense with labor price data, but cannot be construed an appropriate generalized method for accurate derivation of competitive product price data, as it fails to accurately account for discrepancies. Vivona's approach therefore risks polluting the quality of collected price curve data to satisfy the statistical desire for a larger sample size. Vivona does not anticipate filtering data points or accounting for discrepancies in formulation of a price curve. From the results of the price curve and regression analysis, Vivona determines average price. All Vivona's analyses are performed with respect to average price. Vivona does not anticipate different measurements other than average. Vivona does not anticipate competitive price analysis using a subset of marketplace prices based upon characterization of seller pricing models.

U.S. Pat. No. 5,873,069 (Reuhl) "System and method for automatic updating and display of retail prices": discloses "a computerized price control system for implementing pricing standards/policies". "The price-changing function of the system is responsive to competitive price data on identical or substantially similar products in multiple geographic markets for multiple competitors." Reuhl relies upon data gleaned in shopping surveys and input into a computer by hand, not gathered electronically. Reuhl periodically updates prices, as frequently as twice a day. Reuhl only anticipates changing the price to the lowest price found in a geographic are: "the price change function of the system in accordance with the present invention for pricing products in the database implements a pricing strategy (logic) wherein the system user's price is the lowest price in a specified geographic area on a product-by-product basis". Reuhl does not consider price stability, that is, the negative effect on consumer perception of constantly fluctuating prices.

U.S. Pat. No. 5,822,736 (Hartman) "Variable margin pricing system": discloses a method that "generates retail prices based on customer price sensitivity". Hartman bases the method on the assumption that "customers' retail price sensitivity increases as the magnitude of the dollar value of the transaction increases and this increasing sensitivity must be offset with a corresponding decrease of gross profit margin". Hartman does not postulate a competitive pricing model; the system is cost-plus based, with customer price sensitivity being the only independent variable. Competitors' prices are incorporated only indirectly, as reflected in consumer sensitivity: for example, a product often discounted by competitors is considered as highly price sensitive. Hartman assigns products into groups of profit margins relative to consumer price sensitivity, but then suggests, to satisfy a profit margin goal, to shift products from one price-sensitivity group to another, thus glibly violating whatever discipline the method is supposed to impose.

BRIEF SUMMARY OF THE INVENTION

The disclosed technology facilitates a web vendor to post competitive prices while maintaining profitability in the ever-changing world of web e-commerce. One aspect of the disclosed technology is identifying rivals, where rivals are the direct competition to a vendor, other sellers with similar reputation and market positioning to a vendor. Another aspect is pricing competitive against rivals, as contrasted to setting prices based upon all sellers in a marketplace. A variety of statistical methods may be applied to best fit a vendor's sales strategy, as disclosed herein.

The disclosed technology facilitates fine-tuning profitability by optimizing product profit-margin mixes via application of various pricing models. The purpose of the disclosed technology is facilitating implementation of a sales strategy using sophisticated econometric techniques never before so readily realized, but now possible because of the computerized nature of e-commerce.

BRIEF DESCRIPTION OF THE SEVERAL VIEWS OF THE DRAWINGS

FIG. 5a-5d depicts database record structures.

DETAILED DESCRIPTION OF THE INVENTION

The following U.S. patents are herein incorporated by reference: U.S. Pat. No. 6,687,734 (Sellink) "System and method for determining if one web site has the same information as another web site"; U.S. Pat. No. 6,631,369 (Meyerzon) "Method and system for incremental web crawling"; U.S. Pat. No. 6,618,717 (Karadimitriou) "Computer method and apparatus for determining content owner of a website"; U.S. Pat. No. 6,681,255 (Cooper) "Regulating rates of requests by a spider engine to web sites by creating instances of a timing module".

Figure 1:
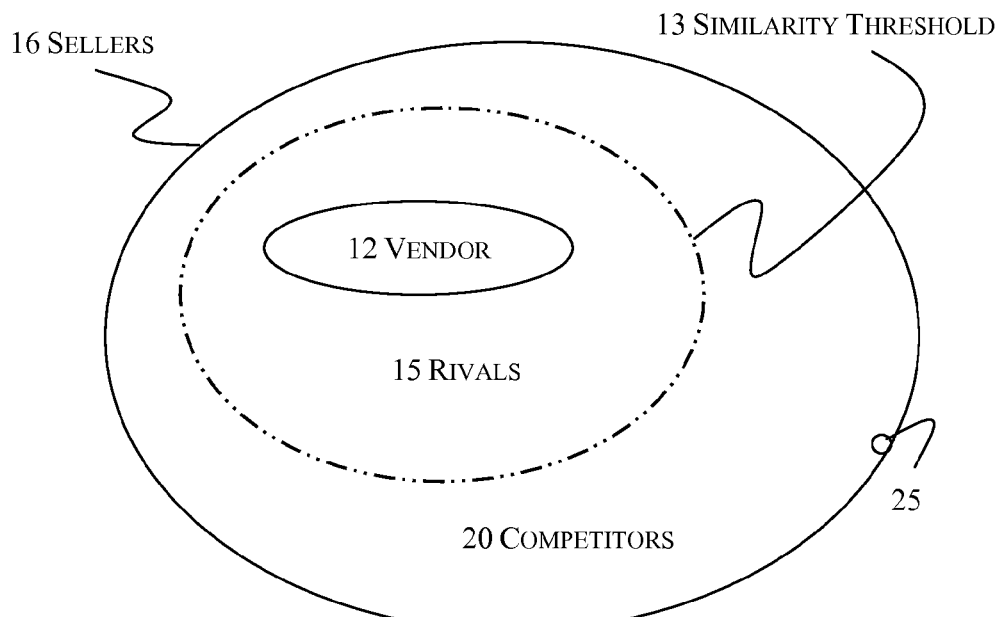
FIG. 1 depicts sellers in a marketplace.

FIG. 1 depicts nomenclature distinctions used in this disclosure for clarity's sake. A marketplace of sellers 16 compete to sell products 1. The disclosure takes the viewpoint of an e-commerce vendor 12 eyeing its competitors 20 on the web. In sophisticated embodiments of the disclosed technology, a subset of all the marketplace competition, a vendor's perceived direct competitors, hereinafter termed rivals 15, represent the greatest threat to a vendor 12 maximizing sales and profitability, and a vendor 12 plays particular attention to its rivals 15 in pricing competitively.

Figure 2:
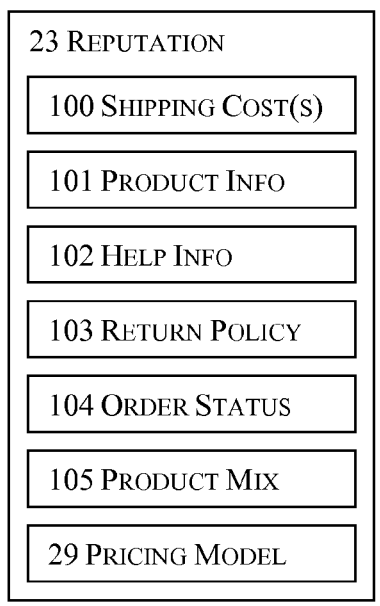
FIG. 2 depicts seller reputation aspects.

Pricing model 29 is given considerable attention herein, but is part of reputation 23. Referring to FIGS. 1 and 2, reputation 23 is the perception of a seller's market position. A vendor's 12 rivals 15 are competitors 20 whose reputation 23 are within a similarity threshold 13.

The disclosed technology relies upon well-known database technology. A very common database technology is the relational database, based upon third-normal form data composition which avoids data redundancy. A set of related data in a relational database may be considered logically as if contained in two-dimensional tables in which attributes or fields are arranged as columns, and each data record of the set appears as a row, with no duplicate rows. Since database is relational, related tables will share at least one column. Tables are created and maintained by a relational database management system ("RDBMS") program. Object databases are a relatively recent extension of relational databases, facilitating database storage on the now-common paradigm of object-oriented programming.

The disclosed technology may be integrated into a vendor's database management system (DBMS), or be a standalone application using either a built-in database, or interfacing an external database product. In one embodiment, the price adjustment technology is integrated into a DBMS that translates select database data to displayable web page content, a technology known to those skilled in the art. In one embodiment, the disclosed technology is used for user-interactive exploration of pricing options. These two embodiments may be employed as different aspects of the same application. Using automatic price adjustment, a change in price generates a new web page for display after updating the database record. If the recommended price adjustment exceeds a preset threshold, a vendor may want to examine the data to determine the price adjustment; in other words, explore pricing options.

Figure 3A:
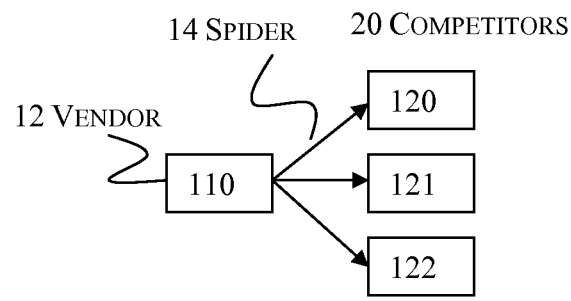
FIG. 3a-3b depicts crawling other vendors' sites.
Figure 3B:
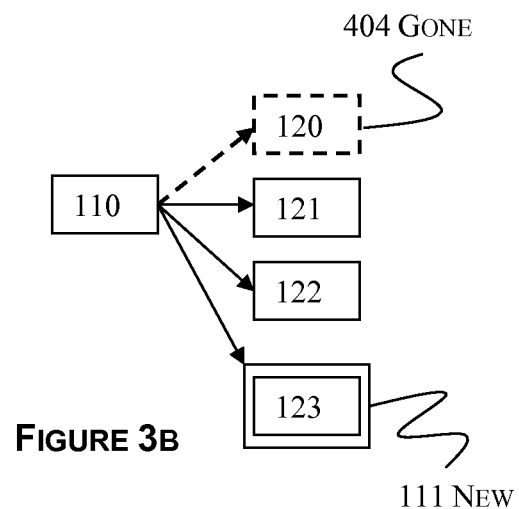

FIG. 3a depicts the process of a vendor 12 computer using a spider 14 to crawl 64 competitors' 20 web sites 120-122 to gain pricing and other related data. Over time, as depicted in FIG. 3b, the mix of competitors changes, as new competitors 111 arrive and others depart 404. Tracking and characterizing the competitive mix through time are essential aspects of the sophisticated embodiments of the disclosed technology. New competitor 111 records are created and erstwhile competitor 404 records retired as the events transpire. Multiple attempts to access a competitor's web site should be attempted prior to assigning the competitor to oblivion, as temporary access problems do occur.

Spider crawls 64 are conducted on a periodic basis. Spider crawls may vary in their extent, such as limiting themselves to known rivals 15, frequency, and the targeted information. As a vendor 12 adds new product 1, for example, crawl 64 for competitive price-related data 40.

Referring to FIG. 5a, a portion of vendor 12 database data comprises a vendor's overall pricing model 19; reputation 13; and item data 11, which is the set of product 1 information. Herein, for clarity, pricing model 19 and reputation 13 refer specifically to a vendor 12, so as to contrast where necessary to competitors 20 and rivals 15, while overall, the designation used for pricing model 29 and reputation 23 corresponds to all sellers 16.

Referring to FIG. 5b, at least a portion of competitor 20 data that a vendor 12 may maintain comprises an identifier 21, assessments of reputation 23, which includes overall pricing model 29, and location 22. A location 22 is typically the URL of the home page of the vendor. Competitor item price data 24 relates to records of items that the competitor sells 40.

A competitor 20 may have multiple locations 22. The multiple locations 22 may be treated as one if there is no discernable difference in pricing model 29, or may be treated as different competitors if the pricing models 29 appear different.

An exemplary product 1 record for a vendor 12 is depicted in FIG. 5c. A product 1, interchangeably called an item, may be a good or service or "productized service" (a combination of good(s) and service(s)). There are two forms of item record (for the vendor or competitor): 1) a static record, representing a point in time; 2) a historical record, essentially a log (which includes current data). FIG. 5c depicts most clearly the embodiment of a static point in time, but is illustrative of a historical record as well. If, in the product 1 record, history is kept of cost 5, breakeven 6, price 3, quantity 7, quality 8, pricing model 9, threshold 10, the log comprising these fields, which is kept using date/time, renders a separate date/time 4 field redundant. History may be kept for a limited time or limited number of changes. Linking multiple static records (which use a date/time 4 for each record) equates to keeping a historical record/log. At least some product price history data must be kept to explore pricing trends.

Continuing with FIG. 5c, an item 1 record comprises a descriptor 2; price 3; date/time 4 (for each entry); cost 5 (history or at least the current cost of inventory in stock); breakeven point 6, which is the minimal acceptable profit margin; quantity 7; quality rating 8 of the item, if relevant; pricing model 9 that corresponds to the item, if different items following different pricing models; and a threshold for automatic price adjustment 10, if used. Some of the item 1 record fields described are optional depending on embodiment. Other fields may be expected to exist in the database record for items 1, such as the location(s) an item may appear on the vendor web site, but these are not germane to the disclosed technology, and so for simplicity in description are omitted.

Figure 6A:
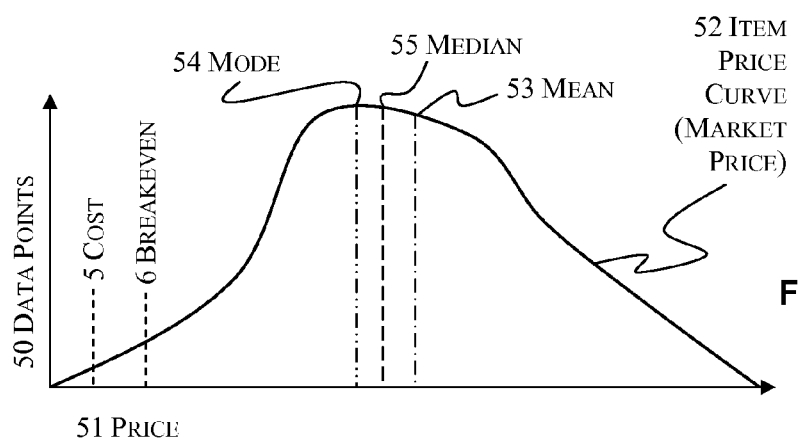
FIG. 6a-6c depicts product market-price curves.
Figure 6B:
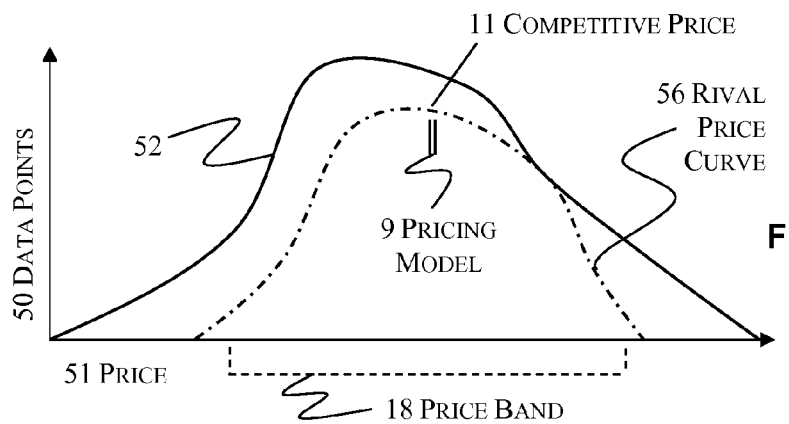

Sellers 16 commonly have different pricing models 49 for different items 40; a single seller pricing model is unheard of. The concept is most simply understood as putting select items "on sale", that is, at a discount, often advertised to draw attention and traffic to a site, and quick sale. Even Wal-Mart, with its "everyday low prices", has sale items. Often, sellers 16 class items 40 with different pricing models 49. Book stores often discount new general-interest books to promote traffic. Hardware stores are often competitive with mid-to-high price items, such as lawnmowers, because consumers will shop around for such items, but are profiteering on light bulbs (because people often buy them only when they must have a replacement, hence are not particularly price-sensitive) and small price-point items such as small quantities of screws or nails (quibbling over pennies to a consumer; to a seller, those pennies add up). In actual software implementation, it is recommended to have a database table (record structure) for pricing models that may be assigned to different categories of items, where, as a suggestion, items has a pricing model classification field, as depicted in FIGS. 5c and 5d. So, the item pricing model 9 depicted in FIG. 6b is suggested as referential to a class of items to which a pricing model applies.

Referring to FIG. 5d, information gleaned from competitor's items 40 are a slightly different set of those for a vendor's 12 items 1: descriptor 42, price 43, date/time 44, quantity 47 and quantity 48 (if available and relevant to the embodiment). The web page location 46 of a competitor item 40 may be kept for convenience, however crawling may be required at times if the item 40 is no longer found at its previous location 46. Some items 40 are dropped, others added. These changes are expected to occur, and records accordingly created or deleted as obsolete (bearing in mind whatever need for historic data). Periodic web crawling 64 is done particularly to find new items 40. A competitor identifier 21 maps to the competitor 20 record. As with the vendor item 1 record, the competitor item 40 record is in the preferred embodiment a historical log.

Discrepancy 45 between a competitor's item 40 and a vendor item 1 may be relevant. For example, it is not uncommon for manufacturers to make many models of the same basic product, typically with different models having slight differences. Different sellers often only choose to carry a subset of a manufacturer's product line. The concept of discrepancy 45 is that of substitution in price curve modeling: slight differences may be accounted for to develop a price curve with more points, rather than insisting on strict identicalness. For example, Apex model 29-a may be the same as Apex model 29-b but without the thingamabob that makes for a manufacturer's-suggested-retail-price (MSRP) difference of $2.00 (which equates to $1.50 street price difference). In developing a price curve for Apex model 29-a, Apex model 29-b price data may be input with a $1.50 adjustment. In other words, if the price discrepancy is known, it may be manually input and thus factored in. A sophisticated automated method to handle such discrepancies, that is, to figure the "street price" difference between these different models, is to perform surveys (spider crawls, or other data gathering) to create price curves for both products, and use the average price difference for the discrepancy adjustment. This same method of discrepancy handling to incorporate a wider base of data for price curve determination may also be used where the difference is qualitative: between new and "like new", for example. Caution is advised to limit incorporating price data with discrepancies to narrow confines, as doing so with wide discrepancies, such as the difference between "like new" and "used" (with "very good" and "good" in between), pollutes the data with externalities related to consumer quality preferences, which represent a cultural attribute. Price curve development using variable item incorporation, that is, taking into account such discrepancies 45, may be implemented by specifying as part of the vendor item descriptor 2 a listing of acceptable substitutes and their price differences, and following an appropriate method to quantify discrepancies 45.

Currency may be a discrepancy 45: a product priced in a different currency, where the currency can be identified by lexical analysis of the symbol of the currency, and/or by the address of the site (which differs by country), and/or text identifying the country of the owner of the site. A currency conversion table may be used to translate a product price into the base currency a vendor uses. One must apply caution in such incorporation, as different market conditions may account for the price difference; such externalities can make for an apples-and-oranges comparison that pollutes the price data. The currency conversion table may be limited to those areas where currency conversion results in reliable price data. If the price data cannot be converted using the table, it is excluded from further consideration. U.S. Pat. No. 6,199,046, though long-winded in its discourse, is suggested to readers particularly keen on the topic of currency conversion.

New competitor products 40 may be brought to a vendor's 12 attention by finding competitors' products 40 that have a discrepancy 45, where as a result a vendor 12 is notified by software, as the discrepancy is unaccounted for in the database record (but the basic model is within the record). An event trigger may occur when encountering a competitor product that lies within a general descriptor 2, but outside an allowed discrepancy 45 (for automatic incorporation into price curve data); the event trigger causing an email to be automatically generated with the location 46 of the found competitor item 40, or an alert display made on a vendor's computer monitor.

Rule-based triggered actions using a database are known to those skilled in the art, and may be employed to maintain data structures and trigger events relevant to performing software operations disclosed herein. Software construction of conditional rule-making, in particular data-based rule triggering, is prior art. For more thorough description of rule-based event management within the context of database operations, suggested references include U.S. Pat. Nos. 5,446,885, 5,283,856, 5,615,359, 5,564,047, and 6,560,592, among other references that these patents cite (cited art) and which cite these patents (forward reference patents).

FIG. 4 depicts exemplary pricing models for the mix of product 1 offered for sale. As described in the background, the reasons for a pricing model vary, but a vendor's 1 overall pricing model 19 is itself a cumulative statement based upon pricing pattern relative to other vendors of the same products. Individual item pricing models 9 may be employed, but it is the overall pattern that comprises a vendor's pricing model. For example, a price competitive 32 vendor may occasionally post a loss-leader item, particularly as an advertising ploy, while posting less competitive products at prices that afford profitability.

Figure 4A:
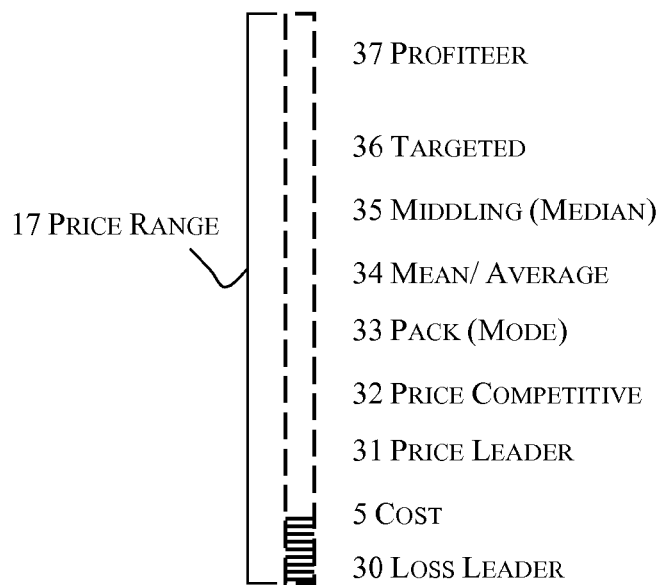
FIG. 4a-4b depicts exemplary pricing models.

Referring to FIG. 4a, with descriptive pricing models, a loss leader 30 as an overall pricing model is a formula for philanthropy or bankruptcy or both. A price leader 31 is consistently aggressively price-competitive, often offering the lowest prices. A price competitive 32 vendor is exactly that. Pack competitive 32 tends toward the most common prices for products. An average 34 competitor's prices tend to be, well, average. Middling competitive 35 tends toward the median price on items, that is, toward the middle. A targeted competitive 36 pricing model is selectively competitive, or competitive within a price band 18 that is a subset toward the higher price range 17. A profiteer 37 is a profit-maximizer, often a boutique or specialty vendor of hard-to-find items. Note that exemplary gradients of pricing models 29 as depicted in FIG. 4a are conceptual and descriptive, but are statistically oriented; the resultant difference in prices between pack 32, mean 34, and middling 35 competitive may be slight (or not, depending on the shape of the price curve). On the web, for competitive products with higher consumer price sensitivity, small price discrepancies may result in substantial sales volume differences.

Figure 4B:
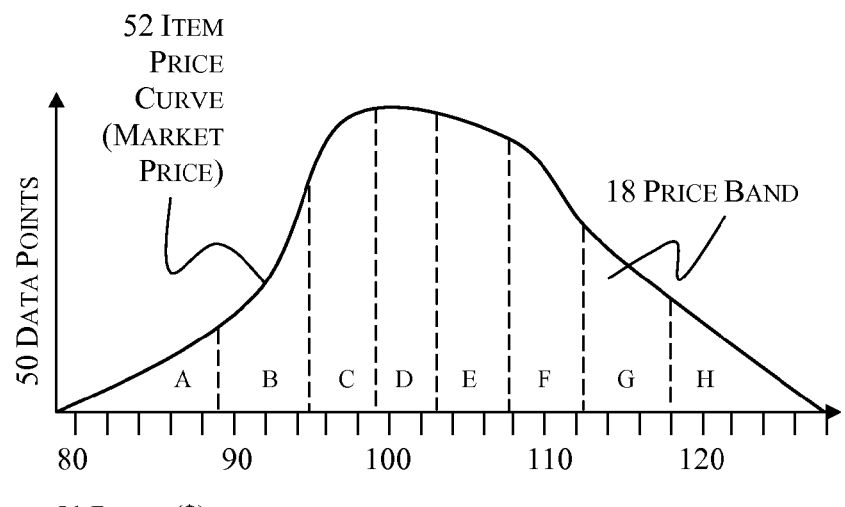

In one exemplary embodiment, referring to FIG. 4b, pricing models are represented as percentile bands, perhaps with thinner bands for percentiles with more price (data) points, so as to better capture potential differences between mid-priced vendors. In the exemplary embodiment depicted in FIG. 4b, price bands are determined by roughly equivalent number of data points, mitigated by a minimum and maximum percent differences in price range. Example 1: starting with the lowest price, include price data points until 15% of the total data points are within the band, not exceeding greater than 15% of the price range (highest price-lowest price), with a minimum band of 5% of the price range. This tends to result in 7-8 bands. In FIG. 4b, the first band (a) is cut off at 15% price range, the second (b) and third (c) fills with 15% of data points. The modal band (d) may be bounded by a minimum price range (5%). Example 2 (not depicted): an equivalent number of data points, perhaps 20%, always resulting in five bands. Using banding, the pricing model decision is setting the price band 18 to be in, and where in the band to be (mid-point or a specific edge, for example). For example, for a relatively aggressive price competitive model using example 2 banding (20% of data points), price at the greater of five percent above breakeven or the mean price of the second band. A middling-competitive seller may use example 1 banding (15% data points, 5% min-15% max price range) and select the average of the fourth band from the high end of the price range. In the example depicted in FIG. 5c, the price might be $105 (band e).

Pricing model characterization can be simple: for example, percent deviation from the single statistical price point, such as mean 53 or mode 54. Similarly, in some embodiments, pricing model decision-making rules may be simple, not requiring banding analysis. For example, by default, price at five percent less than the mode (the most common price) 54, but no less than six percent above breakeven 6.

The rule bases for pricing models 9, and the requisite statistical analysis used for selection, may be as simple or complex as desired. Almost as important as pricing model method is a proper mixture of different pricing models 9 for different items 1 to maximize revenue while remaining competitive. This is sales strategy, and beyond the scope of the disclosed technology, as many exogenous factors drive this process, including for example, supply cost considerations.

FIG. 7 depicts the processes of item price setting and adjustment based upon developing market price curves. These processes may be applied selectively to products, or used with most or all products that a vendor 12 sells. These processes may be repeated periodically, preferably at intervals of days to at most every few weeks, at different times for different product lines, and with different periodicity. Price changes may occur more frequently for some product lines, justifying different periods of market price evaluation. In FIG. 2, processes that may not be expected to change often are illustrated in outlined boxes; revisiting these determinations every few months to ensure that they remain appropriate is recommended.

Figure 7A:
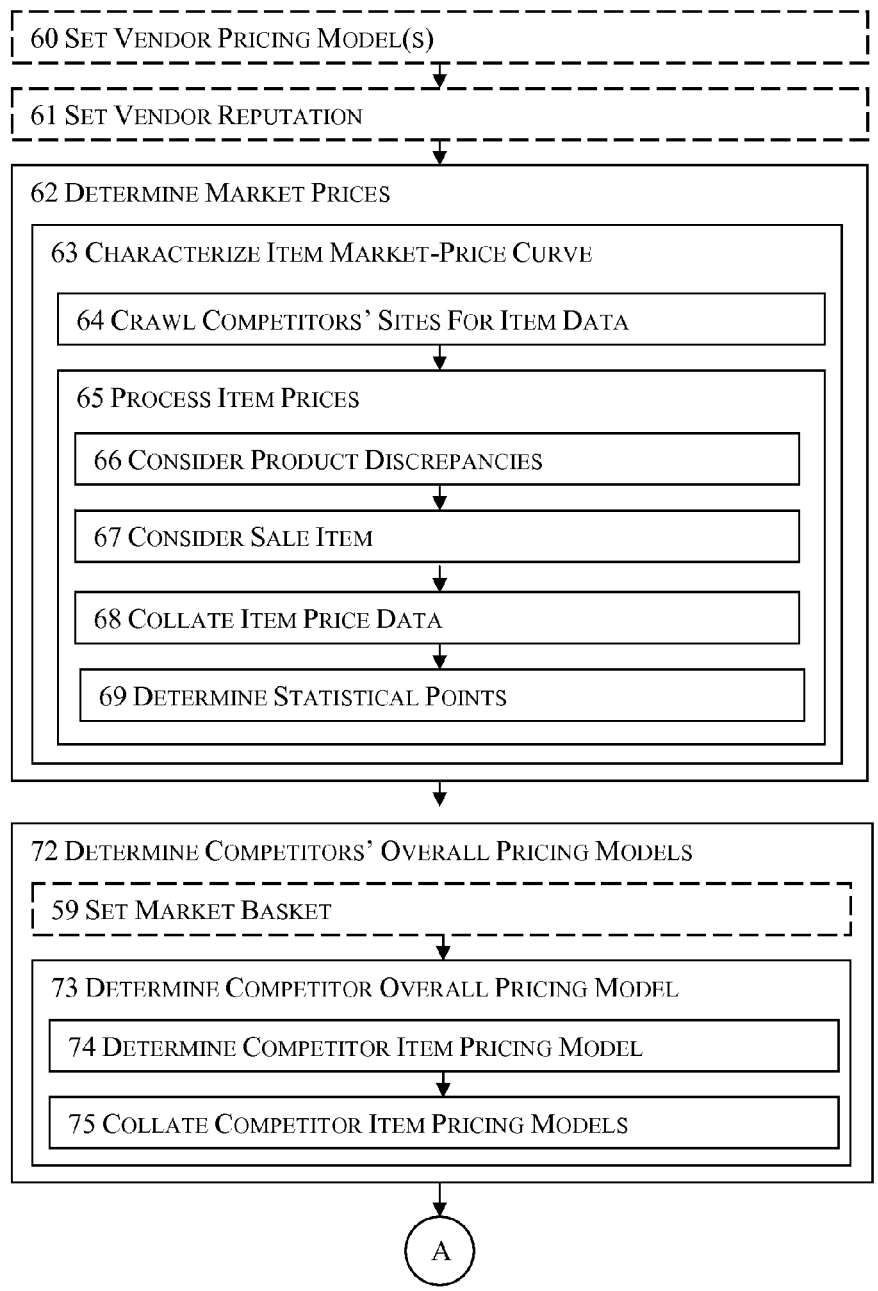
FIG. 7a-7c depicts the process of competitive market-based pricing.

Referring to FIG. 7a, begin by setting pricing models for items 60. In one embodiment, set the reputation that a vendor has 61. Determine market prices 62 for a mix of products. On an item-by-item basis, derive the statistical characteristics of an item's price curve 63. An exemplary item price curve 52 is depicted in FIG. 6a. Price curves 52 may take numerous forms, and should not necessarily be expected to be a normal distribution. The first step in deriving a product market-price curve 63 is to crawl competitors' sites for prices of the same or similar item 64. Collate records of data points of competitors' prices 68, possibly filtering which records are acceptable by considering discrepancies 66 and sale items 67 that might skew the price curve and hence price adjustment. In processing item price data 65 in sophisticated embodiments, having collated data 68, determine statistical points of interest 69, such a mode 54, median 55, and distribution spread in an item price curve 52, that characterize the item market-price curve 63. In the simplest of embodiments, deriving the average price 53 may suffice.

A sale item can be recognized by scanning the web page or product description section with the item listing for specific words or phrases, such as "sale" or "discounted" or "special price". A dictionary of such terms may be used to compare to the product description text to discern that the price is a sale price. The question is how to treat such an item. A vendor does not necessarily want to match every sale price found. Sale items sometimes require a combination or other special purchase, something that may be hard to discern from automated software, and so the price may make a false representation. A sale may be short-lived, a promotional loss leader perhaps, or special purchase, dying a quick death if applying to items in stock, of which there may be few. Yet a sale price may also represent a valid price data point, or be a harbinger. This issue becomes more meaningful if filtering competitors to match to rivals' prices, which winnows data points, making a sale-item price-point a statistically more significant outlier. One simplistic answer is to incorporate all data. An alternate embodiment is to consider whether the sale price point is from a rival 15. If so, only incorporate if the sale price remains for a specified duration; in other words, only if the sale is not temporary (perhaps a close-out or special purchase); in this case the sale price is not incorporated the first time it appears, but perhaps the second time. Price comparison crawls 64 may occur more frequency for items 1 on sale, to better monitor price changes. If not a rival 15, incorporate the price point. As explained below, using an embodiment of focusing on rivals, non-rival competitors may influence prices, though less powerfully than rivals.

Continuing with FIG. 7a, in one sophisticated embodiment, determine competitors' pricing models 72 as a prelude to determining rivals 77 (and subsequent steps in embodiments considering rivals).

Begin by setting a market basket 59. The market basket is the product mix used for statistical analysis in determining competitor pricing models 72. Competitor pricing models 29 may be determined 72 using all products 1 of interest to a vendor 12 (that competitors 20). The market basket may be all products a vendor 12 sells that are subject to the disclosed processes. In one embodiment, a classic statistical sampling technique may be employed to shrink the market basket, that is, reduce the number of items required for determining competitors' overall pricing models 72. In a concept used in market-survey economics, as a measurement simplification, a select subset of products 1 may be considered representative of all products. This sampling technique is perhaps best known to measure inflation in the overall economy. In the United States, the Consumer Price Index (CPI) is based upon a running average of prices of carefully-chosen mixture of goods. For purposes of the disclosed technology, to simplify analysis, a subset of products 1 may be selected to represent the entire product lines that a vendor 12 sells. Suggested selection methods include best-selling items in different categories, or highest-revenue, or highest-profit, or all three. Such products form the foundation for a vendor's 12 profits, and hence, its continuing existence; these are the products that matter most to a vendor 12.

A competitor 20 not selling an item 1 in the market basket does not present a problem. At worst, one or more lost data points does not alter the result. Substitution by accounting for product discrepancy 45 may retrieve some otherwise lost data points. A market basket may be selected that comprises products not all of which the vendor 12 sells, but may be considered reflective of the marketplace.

Continuing with FIG. 7a, to determine a competitor's overall pricing model 73, determine the competitor's item pricing model 74 for each item 1 in the market basket, storing the competitor item pricing model 49 for subsequent use in collating item pricing models 75 to determine a competitor's most common pricing model. Using the banding technique depicted in FIG. 5c, for example, consider for each item 1 each band 18 in which a competitor's price 43 lies by measuring the number of bands away from the mode price 54 (another metric, such as mean price 53, may be used). Sum the deviations and divide by the total number of items 1 in the market basket to determine average deviation. This technique allows different numbers of bands 18 for different items 1 by relying upon deviation from a statistical point of constant significance. A simpler exemplary technique, not using banding, is using percent deviation from a statistical point such as mean 53 or mode 54 or lowest price above cost.

A rival 15 is a competitor 20 that has a similar pricing model 29 with a similar reputation 23. Rivals are a vendor's direct competitors. If a rival 15 has the same quality of reputation 23 as a vendor 12, but consistently lower prices, the vendor's 12 solvency is temporary, as customers migrate to the shopping at the rival 15. If a vendor 12 went out of business, the vendor's rivals 15 would be expected to grab the lion's share of sales from erstwhile customers of that vendor 12.

While the exemplary embodiment bifurcates competitors into two groups, as depicted in FIG. 1, rivals 15 and non-rivals (other competitors), further differentiation is possible in multiple relative groups with regard to similarity to a vendor 12 using multiple similarity thresholds 13. In this embodiment, inclusion of different groups may be used for different analyses. Suggested measurement of price trend 58 using aggressively price-competitive sellers is one example of specialized competitor segmentation.

Figure 7B:
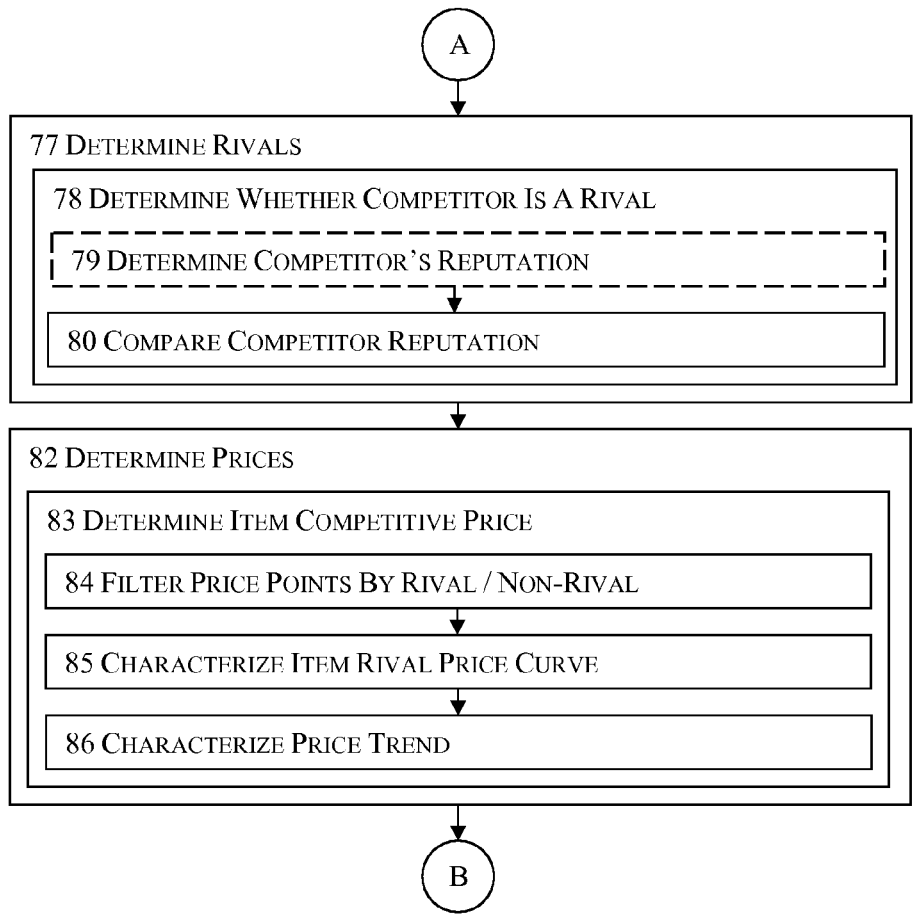

Referring to FIG. 7b, determine rivals 77. Determine whether a competitor is a rival 78 by comparing a competitor's overall pricing model 29 and other reputation 23 factors to a vendor 12. In one embodiment considering rivals 15, the rivals 15 may be hand-picked, possibly without statistical determination. In another embodiment, rivals 15 may be selected entirely upon automated statistical analysis, using a similarity threshold 13 to separate rival 15 from mere competitor 20. Rival determination 78 may be a combination of statistical analysis and human verification. In an embodiment not considering rivals, the entire marketplace may be used for competitive price determination, all competitors 20 essentially being regarded as rivals 15.

Reputation 23 is a statement of a seller's market position. Conceptually, reputation 23 relates to customer perception of seller 16 quality, particularly with regard to the services, both tangible and intangible, offered by a business to its customers: 1) ease in finding the product that meets a customer's need or want (for web sites, this includes easy navigation & good search); 2) attentiveness to detail in product presentation (giving sufficient information to make the customer comfortable in making a purchasing decision); 3) facilitating product comparison; 4) easy purchasing (minimal transaction hassle); 5) customer service—including a) easy to reach & deal with; b) customer-oriented, simple return policy; 6) aesthetics—making a customer feel welcome & comfortable (for a web site, this includes layout and readability). A seller's 16 pricing model 29 is also a key factor to consumer perception of the seller 16, an essential aspect of reputation 23.

Any seller 16 that sells a substitutable product 1 may be considered a competitor 20. The market price curve for a product 52 is defined by all sellers 16 for which data is available. A rival 15 to a vendor 12 is a determination by the vendor 12 that the competitor 20, by its market positioning, is a direct competitor: from a paranoid viewpoint, a most probable cause of lost sales. Sak's Fifth Avenue (or Nordstrom's) and Wal-Mart might sell the same toenail clippers, but the two are not rivals 15: regular customers overlap to a very limited degree. In the reputation 23 factors listed above, particularly 2) product presentation and 6) aesthetics, a wide disparity exists. One could reasonable assess substantial gaps between Wal-Mart and Sak's in other factors as well. Put pithily, Wal-Mart customers can only wish they were shopping at Sak's Fifth Avenue with Wal-Mart prices. Should Sak's Fifth Avenue's sales department lose sleep that it is losing sales of toenail clippers because it price is 60% or even double Wal-Mart's?: doubtful.

Referring to FIG. 2, measurement of factors relevant to a competitor's reputation 23 may be determined 79 using software read a web site's pages to glean metrics of factors deemed critical to reputation 23. Software can collate different measures of factors to determine relative reputations 23. The evaluation software may be run as well on the vendor 12 to provide a standard for comparison to competitors 20. In addition to pricing model 29, example quantifiable factors include: 1) shipping costs 100; 2) help pages 102; 3) product information 101; 4) return policy 103; 5) being able to track order status 104; and 6) product mix 105.

Quantitatively evaluating reputation is inessential to the disclosed technology, but recommended. There are different metrics that may be used to express reputation 23. One embodiment collates weighted measures of factors that may be quantified to derive a single ordinal indicator in a set range. For example, all factors together may total a maximum reputation of 100, where 100 is identical to the vendor's reputation 13. Note that, referring to FIG. 1, the competitor most dissimilar to the vendor 25 is unlikely to score zero, because in some factors the overall most dissimilar competitor 25 may be more like the vendor 12 than other competitors 20. Continuing the example, if pricing model is 25% of the total, a rival may score 25 if its overall pricing model is identical to the vendor. A score of 0 is the maximum degrees of separation away from the vendor. Consider an embodiment where the overall pricing model measurement is from the mean price. Sum and average the percent deviations from the mean price for the product mix: the vendor's pricing model is at −5%, and one competitor's pricing model is at the maximum away from the mean (and vendor) at +20%, a net difference of 25% from the vendor; that sets the scale at 1 point for every 1% deviation from the vendor. So, subtract one point (out of a possible 25) from a competitor's pricing model measurement for every percent difference away from −5% (the vendor's pricing model score). Suggested reading on the topic of statistical factor analysis of qualitative (but quantifiable) factors is U.S. Pat. No. 6,606,102; similar methods may be used for software evaluating reputation 79.

Shipping costs 100 are often expressed by cost per item or number of items. Automated software may be used to determine item shipping cost. Shipping cost is often a very significant factor in purchase decisions, and shipping costs between vendors can vary widely. Considerable weight on shipping cost as a discriminating reputation factor is recommended. Per-item shipping cost may act as a bellwether statistic.

The total number of words devoted to reputation-enhancing matters may serve a rough metric of vendor attention to reputation 23. The web site section devoted to providing helpful consumer information 102 is indicative, and recommended as a significant measure of a vendor's reputation 23, as it expresses a seller's attention to informing consumers to enhance comfort in buying from a seller. With help from a spider 14, for example, sum the word-count of help pages 102: starting at the top help page, then drilling down to linked pages, only including relevant pages, which may be determined by checking for the inclusion somewhere on the page of the word "help" and/or the vendor's name, or inclusion of some words in a dictionary that typically appears on such pages.

Lawyer language most certainly should be excluded from any word count algorithm, as it hardly qualifies as customer-friendly. Small print is one indication (the large print giveth and the small print taketh away). A dictionary may be constructed of common legal terminology, where a threshold of word frequency of these words serves to exclude the page from consideration as reputation-enhancing. The length of lawyer language may be used as a slight quantified negative to reputation 23.

A very significant reputation 23 factor is providing product information 101 to consumers. The average descriptive word count per item 1, coupled with average number of photos per item, may account for a significant degree of reputation 23 evaluation.

Return policy duration is commonly 30 days. Automated software may be used to determine return policy duration. Explanation of return policy may also be considered consumer-friendly. Almost all e-commerce vendors have a return policy; other than duration, only consumer experience is telling, and such information is not easily statistically collated. A suggestion is to count return policy as a factor only if duration is less than 30 days, which would be a negative. Not having a return policy turns what is normally a small issue into a decisive consideration.

A software spider 14 may be used to determine whether a seller offers order status tracking, searching and using lexical analysis of words like "order status tracking".

Product mix 105 may be factored by omission from the selected market basket; omission resulting in a slightly lower rating. Another quantitative method to measure product mix 105 is to sum the number of different products offered in a select number of product categories deemed important to a vendor; the higher the count, the higher the rating. These two methods may be combined for a fuller accounting of a competitor's product mix 105 rating.

As disclosed with the above examples, factor-weighted evaluation may be coded in software to determine a competitor's reputation 79. An exemplary weighing of the factors comprising reputation 23: pricing model: 25%; product information: 20%; product mix 15%: shipping costs 15%; help information 13%; order tracking 7%; return policy 5%. This factor-weighing may vary depending upon to what degree and which measures a vendor 12 values. A similar factor-weighed evaluation may be made by a human, supplemented by computer-generated data where available for different factors. Vendors are typically aware of who their rivals are; using quantitative techniques at least for validation is prudent. The knowledge of known rivals 15 may be supplemented by finding competitors 20 who have a similar pricing model 29 to a vendor 12 and triggering software or human investigation to evaluate reputation 79 and determine whether a competitor is a rival 78.

The final step in determining whether a competitor 20 is a rival is comparing the competitor reputation to the vendor standard 80. If the comparison is within a preset threshold 13, that is, within a set deviation from the vendor 12, the competitor 20 is considered a rival 15. Rivalry may also be decided by taking a set percentage of competitors 20 closest to the vendor 12 in reputation 23 (where all competitors 20 considered comprise 100%), in which case the similarity threshold 13 is a proximity percentage.

Continuing with FIG. 7b, determine competitive prices for items 82 item by item 83. In an embodiment considering rivals 15, filter rival to other competitor price points 84. As depicted exemplarily in FIG. 6b, use the rival price points to determine the rival price curve 85.

FIG. 6b depicts an example of discrepancy between overall item price curve 52 and rival price curve 56. As depicted, rivals 15 price the item 1 on average slightly higher than the overall marketplace. This discrepancy is explained by reputation 23 factors: the vendor 12 may be a well-respected business, known for its excellent business practices. Less well regarded competitors 20 must compete more on price 51. For example, Amazon may not consistently have the lowest prices on the web, but it offers a tremendous variety of goods with plentiful product information, low shipping costs, and is known for accurate and rapid product fulfillment.

Figure 6C:
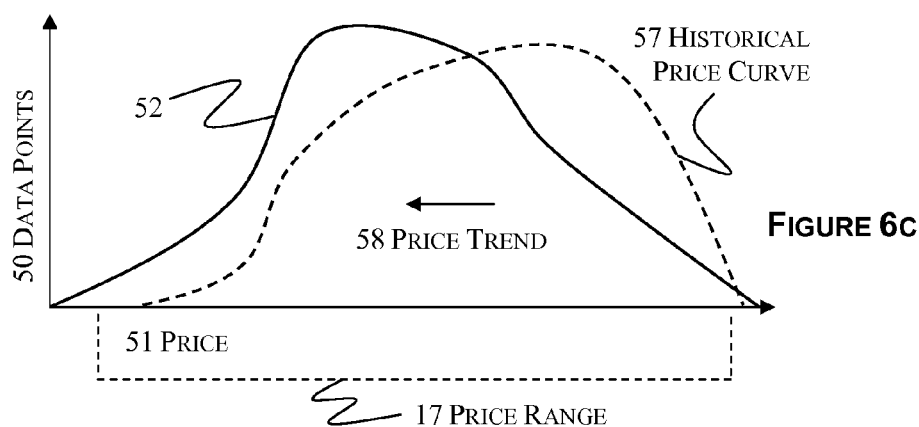

Continuing with FIG. 7b, determine price trend 86. This step is optional but recommended. FIG. 6c depicts an exemplary change in pricing for an item 1. A historical item price curve 57 compared to the current item price curve 52 reveals a declining price trend 58. A simple derivation of price trend 58 may be had by comparing mean 53, median 55, or mode 54 prices at sequential points in time. The market price curve 52 is recommended to discern price trend 58, though, if the vendor 12 competes strongly on price, rival price curves 56 may be more telling, as high-end sellers 16 tend to have "sticky" prices, attempting to maintain margins as long as feasible. In one embodiment, a vendor 12 may consider the most price-competitive sellers 20 the best measure of price trend 58; price-competitive sellers 20 being within a specified threshold of having the lowest average prices (the low-end pricing models) for a product mix 105.

Figure 7C:
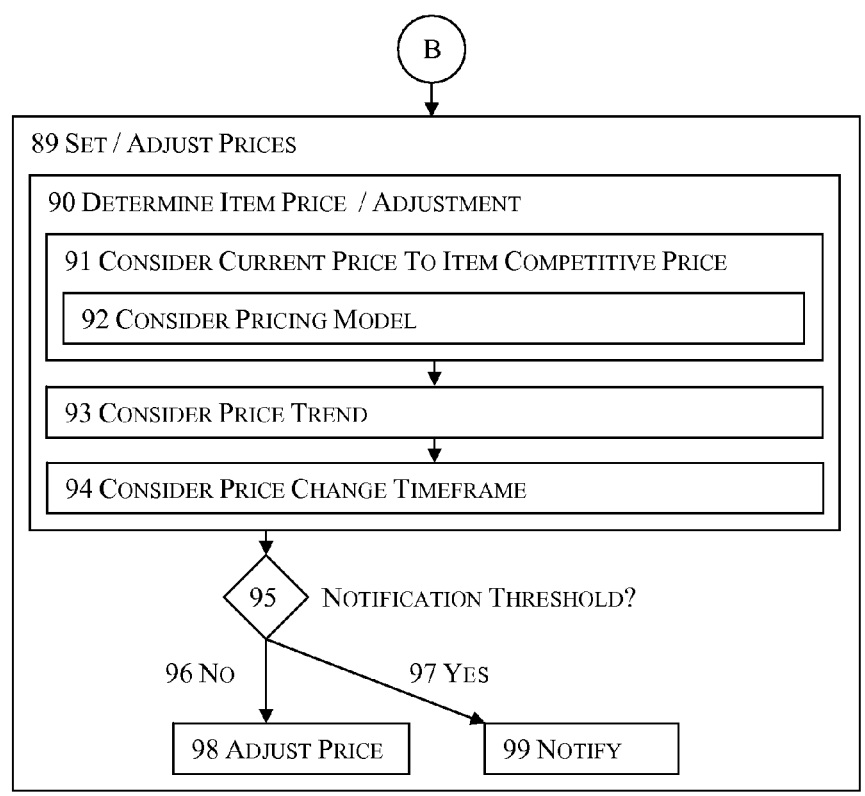

Referring to FIG. 7c, set prices for new items 1, or adjust prices on existing items 89, item by item. Price adjustment may be done uniformly for a set of items. This is, items may be grouped such that analysis and adjustment occurs for all items in the group. In this case, an item 1 refers to a group of items. Price setting may also be done similarly, using a percentage above cost 5 or breakeven 6. For each item, determine the price 90 (which may equate to a price adjustment for an existing product). The essential step is to consider the current price to the item competitive price 91, however construed. Depending upon embodiment, the item competitive price may reflect the rival price 56 or market price curve 52. Competitive pricing is done by applying the item pricing model 92, but other factors in some embodiments play a role in determining price adjustment 90: the price trend and the price change timeframe.

Consider the price trend 93: the current competitive price may be transitory to a newly developing more stable price point. Consider the price change timeline 94: price churning, that is, changing prices too frequently, potentially confuses potential customers, degrades reputation, and may result in lost sales. Price trend and timeline are different aspects of the same issue: maintaining price stability while reflecting marketplace changes.

A vendor 12 faces a potential problem with significantly lowering prices (ratcheting prices): if price adjustments are not offered recent buyers, they may return a product conformant with the return policy, and buy a replacement at the lower price. There is of course transaction cost for such customers to consider. At least, a feeling of dissatisfaction may result.

Between churning and ratcheting prices is a smoother approach: anticipate price trends 93 and stabilize prices. While rival competitive price is a primary determinant, price trend 58 acts as an influence on competitive pricing. A threshold-based rule system may be used to determine the price adjustment 90, where the rule system is based on a nexus of time frame, change in current competitive price per item pricing model, price trend, and sales trend. Changing cost or breakeven points should affect the calculus as well.

For example, by default, a price may be expected to last for 20 days without change with exceptions: >5% change in competitive price with sales declining >10%. A price change may be set to competitive price with an influence of price trend and sales trend. For a middling competitive model, if sales are declining and pricing trend 58 is further price declination, decrement price the same percentage as market price trend for the past survey period. If sales are not declining and price is declining, decrement price by one-half the percentage as market price trend. If competitive price is rising, raise price to match unless sales are rising greater than the half the percentage of the price rise; the intended effect being don't raise prices if customers are flocking to you because the competition is raising prices. If cost declines, match rival price decline to the extent of maintaining at least the same percentage profit margin, unless sales are declining and the marketplace price trend is declining faster, in which case match or exceed the marketplace percentage price drop for the current period as long as the price remains above breakeven. As a general rule, do not adjust price below breakeven 6 without notification. As these examples suggest, complex factor-interdependent may be constructed to optimize sales and revenue generation while maintaining profitability.

Once the price adjustment is determined 90, in one embodiment, a change over a predetermined threshold 95, which may be a relative or absolute amount, triggers notification 99 by the software, rather than automatic price adjustment 98.

A specific example: the price for a vendor item 1 has been stable for two months. In the past month, rival prices have gone down 3%, 1% the month previous. The marketplace trend 58 over the past two months has shown a decline of 7%, with a 2% the month before and a 5% drop this past month. Sales are 5% less in the past month. Inventory in stock is low, and replacement stock cost is presently 4% less. Rather than match the 4% rival price decline, considering the trend 58, consider lowering the price by at least 6-8%. A threshold percentage of 5% requires notification, so notify the vendor of the suggested price adjustment of 6-8%.

In the case of automatically adjusting the price 98, the adjusted price, stored in a database record, may be translated to an updated version of the web page displaying the product to which the price belongs. U.S. Pat. No. 5,897,622 discloses such technology. In the case of seeking approval notification 99, if the notification does not automatically include the data, the approver may use an interactive tool to explore the acquired competitive data as a basis to make a pricing decision.

Notification 99 may employ one or more methods: through a software application user interface alert service, such as a sound and/or display, by electronic messaging, or by email. Numerous techniques of software-triggered notification are known to those skilled in the art.

Price curves for individual items or groups of items such as depicted in FIGS. 6a-6c may be shown to a shopper to demonstrate a vendor's competitiveness. The price curve 52 may include a point indicating the vendor's price. Other graphical displays of various forms, such as bar graphs, may be used to the same effect. Scatter diagrams with rivals' prices may be used to show comparative prices. If prices are rising, a vendor 12 may depict a price trend 58 diagram, as in FIG. 6c, to show how it resists raising its price.

A vendor considering carrying a new product 1 may use the disclosed technology to find the market price of the item 1. The disclosed technology may be used to quantitatively explore the profitability of carrying new items.

The invention claimed is:

1. A system that is adapted to categorize a seller relative to a vendor comprising:
   a processor;
   a memory;
   an overall pricing model for a vendor being stored in the memory, wherein the overall pricing model comprises a position within an ordinal range of pricing levels, and wherein said overall pricing model relates to a composite representation of item pricing models for a set of on-sale items;
   product-specific data for a first set of items being stored in the memory, wherein said first set comprises a plurality of items;
   a first set of instructions being stored in the memory that, when executed, determines a product mix comprising a plurality of items from said first set of items and stores said product mix in the memory;
   a second set of instructions stored in the memory that, when executed, read said product mix as a basis for search, whereby finding, via network connection, for a first set of sellers, current prices for a result set of items, wherein said first set of sellers comprises at least a first seller, wherein said first set of sellers does not include said vendor, as current prices for a plurality of on-sale items in said product mix by said vendor are available from a database without network search, and wherein said result set of items comprises a plurality of items in said product mix;
   storing prices for said result set item prices;
   a third set of instructions stored in the memory that, when executed,
   (a) statistically characterize respective item price data by determining data representative of an item price curve for respective items in said result set of items,
   (b) store said item price curve data in the memory,
   (c) derive respective seller item pricing models for a plurality of items in said result set of items, wherein a said item pricing model comprises a position within a relative range of pricing levels for said plurality of items based upon said item price curve data;
   determining an overall pricing model for said first seller using a plurality of said first seller item pricing models;
   a fourth set of instructions stored in the memory that, when executed, categorize said first seller by at least in part comparing said first seller's overall pricing model to at least one threshold of similarity to said vendor's overall pricing model; and
   storing said first seller categorization.

2. The system of claim 1, wherein a determination is made as to whether said first seller is a rival to said vendor based, at least in part, upon a plurality of factors calculated by computer and input by a computer user, wherein a rival comprises the highest threshold of similarity to said vendor.

3. The system of claim 1, wherein the product mix is determined, at least in part, upon at least one statistical measure of a said item's financial significance to said vendor.

4. The system of claim 1, wherein the product mix is determined using a predetermined item categorization.

5. The system of claim 1, wherein the product mix comprises a representational cross-section of items offered on-sale by said vendor.

6. The system of claim 1, wherein a determination is made as to whether the first seller is a rival to said vendor using, at least in part, statistical analysis or input received from at least one user interface device.

* * * * *